(12) United States Patent
Talon et al.

(10) Patent No.: US 10,538,380 B2
(45) Date of Patent: Jan. 21, 2020

(54) CAPSULE FOR BEVERAGE PREPARATION

(71) Applicant: NESTEC S.A., Vevey (CH)

(72) Inventors: Christian Talon, Vufflens-le-Chateau (CH); Nicolas Jean-Guy Bezet, Macon (FR)

(73) Assignee: Societe des Produits Nestle S.A., Vevey (CH)

( * ) Notice: Subject to any disclaimer, the term of this patent is extended or adjusted under 35 U.S.C. 154(b) by 561 days.

(21) Appl. No.: 14/894,605

(22) PCT Filed: May 28, 2014

(86) PCT No.: PCT/EP2014/061050
§ 371 (c)(1),
(2) Date: Nov. 30, 2015

(87) PCT Pub. No.: WO2014/191456
PCT Pub. Date: Dec. 4, 2014

(65) Prior Publication Data
US 2016/0107831 A1    Apr. 21, 2016

(30) Foreign Application Priority Data
May 28, 2013    (EP) .................................... 13169576

(51) Int. Cl.
B65D 85/804 (2006.01)
(52) U.S. Cl.
CPC ............... B65D 85/8043 (2013.01)
(58) Field of Classification Search
CPC ...... A47J 31/40; A47J 31/407; A47J 31/0678; B65D 85/8043
See application file for complete search history.

(56) References Cited

U.S. PATENT DOCUMENTS

2004/0206245 A1* 10/2004 Halliday ............. A47J 31/0673
99/337
2005/0193896 A1    9/2005 McGill
(Continued)

FOREIGN PATENT DOCUMENTS

CH          605293 A5     9/1978
CN       101687592 A      3/2010
(Continued)

OTHER PUBLICATIONS

Japanese Office Action for corresponding application No. 2016-516146, Dispatch No. 081229, Dispatch Date Feb. 27, 2018, 7 pages.

*Primary Examiner* — Viren A Thakur
*Assistant Examiner* — Lela S. Williams
(74) *Attorney, Agent, or Firm* — K&L Gates LLP

(57) ABSTRACT

The present invention is directed to a container (11) for food or beverage preparation, adapted for containing at least one precursor ingredient within at least one compartment (34), and comprising an injection wall (17) for coupling to a food or beverage preparation machine (1) having at least one pressurized source of a mixing ingredient, whereby a food or beverage product is prepared within said container (11) by mixing said mixing ingredient with said precursor ingredient, said container (11) further comprising at least one food or beverage delivery wall (16, 37), characterized in that said injection wall (17) comprises outwardly expandable connection means (18, 19, 20) suitable for connecting said container (11) to said mixing ingredient source and establish a fluid communication between said container and said mixing ingredient source.

18 Claims, 13 Drawing Sheets

(56) References Cited

U.S. PATENT DOCUMENTS

| | | | |
|---|---|---|---|
| 2007/0175335 A1* | 8/2007 | Liverani | A47J 31/3695 99/279 |
| 2009/0007793 A1 | 1/2009 | Glucksman et al. | |
| 2010/0011964 A1 | 1/2010 | White et al. | |
| 2010/0282091 A1* | 11/2010 | Doleac | B65D 85/8043 99/295 |
| 2012/0015080 A1* | 1/2012 | Roulin | A47J 31/407 426/110 |
| 2013/0011521 A1* | 1/2013 | Weijers | A47J 31/36 426/87 |
| 2013/0323366 A1* | 12/2013 | Gerbaulet | A47J 31/22 426/77 |

FOREIGN PATENT DOCUMENTS

| | | |
|---|---|---|
| CN | 102238890 A | 11/2011 |
| CN | 102596757 A | 7/2012 |
| EP | 242556 A1 | 10/1987 |
| EP | 1472156 B1 | 3/2006 |
| EP | 1967100 B1 | 5/2009 |
| EP | 2062831 A2 | 5/2009 |
| EP | 2236437 | 10/2010 |
| EP | 2162653 B1 | 6/2011 |
| EP | 2412646 A1 | 2/2012 |
| EP | 2559636 A1 | 2/2013 |
| JP | 2007149598 A | 6/2007 |
| JP | 2010069281 | 4/2010 |
| RU | 2435723 C2 | 12/2011 |
| WO | 2012019902 A1 | 2/2012 |
| WO | 2012019903 A1 | 2/2012 |
| WO | 2012104760 | 8/2012 |
| WO | 2012127233 | 9/2012 |

\* cited by examiner

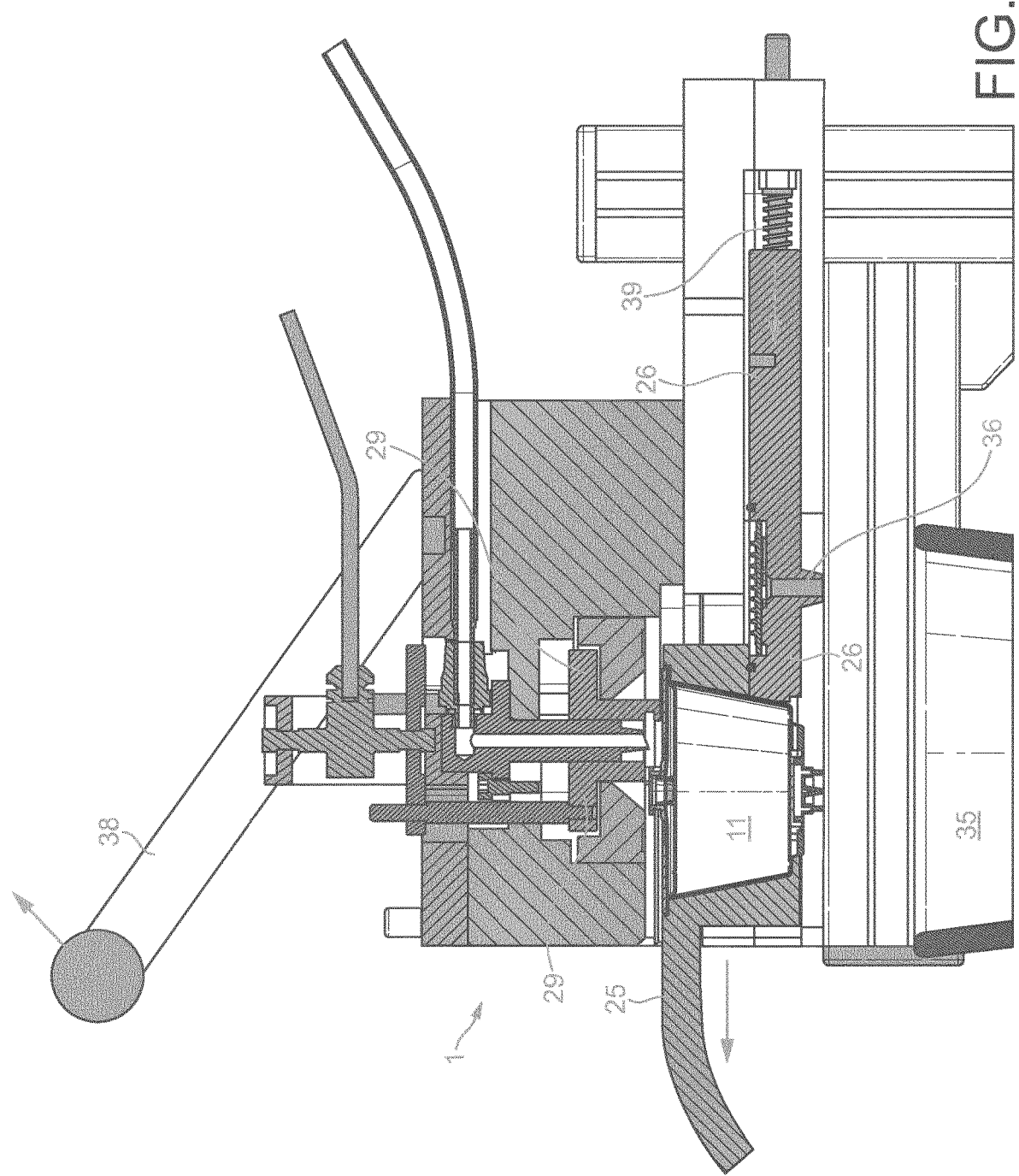

CAPSULE FOR BEVERAGE PREPARATION

CROSS REFERENECE TO RELATED APPLICATIONS

The present application is a National Stage of International Application No. PCT/EP2014/061050, filed on May 28, 2014, which claims priority to European Patent Application No. 13169576.9, filed on May 28, 2013, the entire contents of which are being incorporated herein by reference.

FIELD OF THE INVENTION

The present invention concerns a container for food or beverage preparation, said container being designed for connection to a pressurized ingredient source, such as a pressurized water source, to be mixed with the container contents for preparing said food or beverage.

BACKGROUND OF THE INVENTION

In the field of food or beverage preparation by mixing a precursor ingredient contained in a container, with a mixing ingredient fed from an pressurized source contained in a food or beverage preparation machine.

In the following description, it will be considered that the source of mixing ingredient is a pressurized water source. Such a limitation should not be taken as a limitation of the invention scope. The container described and claimed therein can be used with other sources of mixing ingredient.

Also, in the rest of the present description, and for simplification purposes, it will be considered that the container of the invention is a beverage container, for instance a beverage capsule. Again, this should not be taken as a strict limitation of the scope of the invention. The container of the invention can be of another type than a capsule, for instance it can be a soft pad, a pod, a sachet, a rigid or semi-rigid cartridge, or a combination thereof. It can be made of any type of material like plastic, paper, cardboard, metal or alloy, glass, synthetic or natural rubber or elastomer, or a combination thereof. Preferably, materials will be chosen from cost-effective and ecologic material, having barrier properties, at least against moisture and oxygen. The precursor ingredient contained in the container of the invention can be of any type for preparing a food or a beverage product. In the following a beverage container will be described in more detail. However, the principle of the invention can be applied to any container for preparation of an edible preparation, be it a beverage or a semi-solid or solid food, such as for example but not limited to: ice cream, potage, smoothies, cooking dough, soup comprising solid elements such as croutons, or even fully solid food such as pastry.

Generally, food or beverage preparation machines are well known in the food science and consumer goods area. Such machines allow a consumer to prepare at home a given type of food or beverage, for instance a coffee-based beverage, e.g. an espresso or a brew-like coffee cup, or other types of beverages like chocolate, teas, soups and the like.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules.

The machine comprises a receptacle or cavity for accommodating said capsule and a fluid injection system for injecting a fluid, preferably water, under pressure into the capsule. Water injected under pressure in the capsule, for the preparation of a coffee beverage according to the present invention, is preferably hot, that is to say at a temperature above 70° C. However, in some particular instances, it might also be at ambient temperature, or even chilled. The pressure (relative to atmospheric pressure) inside the container/capsule chamber during extraction and/or dissolution of the capsule contents, until the capsule opens, increases up to typically about 1 to about 8 bar for dissolution products and about 2 to about 12 bar for extraction of roast and ground coffee. Such a preparation process differs a lot from the so-called "brewing" process of beverage preparation—particularly for tea and coffee, in that brewing involves a long time of infusion of the ingredient by a fluid (e.g. hot water), whereas the beverage preparation process allows a consumer to prepare a beverage, for instance coffee, within a few seconds.

The principle of extracting and/or dissolving the contents of a closed capsule under pressure is known, and consists typically of inserting the capsule in a receptacle or cavity of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule. Capsules allowing the application of this principle have already been described for example in applicant's European patents no. EP 1472156 B1, and EP 1784344 B1.

Machines allowing the application of this principle have already been described for example in patents CH 605 293 and EP 242 556. According to these documents, the machine comprises a receptacle or cavity for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

The machine further comprises a fluid tank—in most cases this fluid is water—for storing the fluid that is used to dissolve and/or infuse and/or extract under pressure the ingredient(s) contained in the capsule. The machine comprises a heating element such as a boiler or a heat exchanger, which is able to warm up the water used therein to working temperatures (classically temperatures up to 80-90° C.). Finally, the machine comprises a pump element for circulating the water from the tank to the capsule, optionally though the heating element. The way the water circulates within the machine is e.g. selected via a selecting valve means, such as for instance a peristaltic valve of the type described in applicant's European patent EP 2162653 B1.

When the beverage to be prepared is coffee, one interesting way to prepare the coffee is to provide the consumer with a capsule containing roast and ground coffee powder, which is to be extracted with hot water injected therein.

In many instances, the machine comprises a capsule holder for holding a capsule, which is intended to be inserted in and removed from a corresponding cavity or receptacle of the machine. When a capsule holder is loaded with a capsule and inserted within the machine in a functional manner, the water injection means of the machine can fluidly connect to the capsule to inject water therein for a food preparation, as described above. A capsule holder was described for example in applicant's European patent EP 1967100 B1.

In most known food or beverage containers (e.g. capsules) are designed to function with food and beverage preparation machines, that comprise means for injecting a mixing ingredient (e.g. water) inside the capsule which are movable, more precisely, that are displaced towards the container when said container is inserted inside said machine in functional configuration. Typically, such injection means of the machine are displaced after the container (e.g. the capsule) is inserted therein and the machine is closed. In such a configuration, the injection means of the machine protrude in the compartment used for loading the capsule. Although such a fluid connection principle works and is commonly used, it poses a certain number of issues, among which ensuring a proper and reliable leaktightness at the interface between the capsule and the machine. The reason is that capsules are usually manufactured with thin walls (for ecological and cost reasons), so that they can easily be deformed when an external pressure is exerted thereon. At the time the injection means of the machine are moved towards the capsule, the latter tends to deform, even slightly, which creates leaking channels. Such leaking risks require additional technical design and reinforcement of the capsules and machines to guarantee leaktightness, which are expensive and complex to put in place.

Furthermore, capsules have been developed for such an application of food preparation, and in particular for beverage preparation, which are described and claimed in applicant's European patent EP 1784344 B1, or in European patent application EP 2062831.

In short, such capsules comprise typically:
- a hollow body and an injection wall which is impermeable to liquids and to air and which is attached to the body and adapted to be punctured by e.g. an injection needle of the machine,
- a chamber containing a bed of roast and ground coffee to be extracted, or a soluble ingredient or mix of soluble ingredients,
- an aluminium membrane disposed at the bottom end of the capsule, closing the capsule, for retaining the internal pressure in the chamber.

The aluminium membrane is designed for being pierced with piercing means that are either integral with the capsule, or located outside of said capsule, for example within a capsule holder of the machine.

The piercing means are adapted for piercing dispensing holes in the aluminium membrane when the internal pressure inside the chamber reaches a certain pre-determined value.

Also, optionally, the capsule can further comprise means configured to break the jet of fluid so as to reduce the speed of the jet of fluid injected into the capsule and distribute the fluid across the bed of substance at a reduced speed.

In many food and beverage preparation systems, several types of containers (such as capsules) can be used with the same machine. Some capsules can be used for infusion of a stationery precursor ingredient (e.g. roast and ground coffee) through which the mixing ingredient (e.g. hot water) flows. Some other capsules may also contain a soluble precursor ingredient, such as a soluble milk or chocolate powder, which is dissolved by mixing with a mixing ingredient like hot water.

Particularly in case the precursor ingredient contained in the capsule is soluble, it requires a large headspace built-in the capsule to ensure that the mixing ingredient (which is preferably liquid) injected from the machine within the capsule, can properly mix with the precursor ingredient contained in said capsule. Such a proper mixing is guaranteed by a whirling movement of the ingredients inside the capsule. The whirling movement requires sufficient space within the capsule.

In known solutions, there is a need to enlarge the volume of the capsule way beyond the volume strictly required for containing the precursor ingredient, in order to provide sufficient headspace for the mixing process to take effect. However, bigger capsules require additional packaging material to make the capsule. This is undesirable for convenience, cost and ecological reasons. Headspace inside the capsule is therefore considered wasted volume, and should be avoided as much as possible.

It is therefore an objective of the present invention to provide a container which obviates the drawbacks of the known food and beverage containers and systems.

SUMMARY OF THE INVENTION

The objective set out above is met with a container for food or beverage preparation, adapted for containing at least one precursor ingredient within at least one compartment, and comprising an injection wall for coupling to a food or beverage preparation machine having at least one pressurized source of a mixing ingredient, whereby a food or beverage product is prepared within said container by mixing said mixing ingredient with said precursor ingredient, said container further comprising at least one food or beverage delivery wall, characterized in that said injection wall comprises outwardly expandable connection means suitable for connecting said container to said mixing ingredient source and establish a fluid communication between said container and said mixing ingredient source.

Due to the fact that the fluid connection between the capsule and the machine is done by expanding the capsule towards the machine, no compression force is created onto the capsule at the interface where the fluid connection is established, which could create unwanted deformation and leakage; the expansion of the capsule is controlled and the fluid connection at the interface between the capsule and the machine is therefore leaktight.

The outwardly expandable connection means can comprise either at least one stretchable portion, or alternatively at least one deployable bellows-like portion, of the injection wall capable of being outwardly deformed, elastically or plastically, by an outward thrust without tearing or breaking.

In a highly preferred embodiment of the invention, the deformation is an elastic deformation such that when the outward thrust applied to the container stops, the deformed portion of the container comes back to its initial position ("rest position").

Advantageously, the expandable connection means comprise:
(i) a connection opening for conducting said mixing ingredient from said at least one mixing ingredient source, towards the interior of the container when a fluid communication is established between said container and said source,
(ii) an expandable wall portion of the container, that is able to be expanded outwardly with an increase of between 1% and 200%, preferably between 2% and 100%, more preferably between 5% and 80% of its initial volume, and
(iii) catching means adjacent to said stretchable portion, said catching means being adapted for cooperating with a expansion actuator of the machine that is able to expand said expandable wall portion.

In this case, the expandable wall portion is preferably a circular zone that surrounds said connection opening.

Furthermore, the connection opening preferably has the shape of a cylinder that extends from the injection wall outwardly, and more preferably, said connection means further comprises a wall adjacent to said expandable wall portion, for closing said connection opening, said wall being made of a material barrier to at least moisture and oxygen, and said barrier wall being openable by the pressurized mixing ingredient source.

In the latter case, the barrier wall is openable either by piercing by a piercing element of the pressurized mixing ingredient source, or alternatively it is openable by tearing by the pressure exerted by the pressurized mixing ingredient.

The catching means can comprise a rigid groove, or a magnetic surface. Preferably, said catching means surrounds and delimits the connection opening.

In a preferred embodiment of the invention, the container is a food or beverage capsule.

The container preferably comprises a rigid body having lateral walls, a bottom wall, the lateral walls defining an upper opening with outer peripheral edges onto which the injection wall is attached.

Also, highly preferably, the container further comprises a rigid or semi-rigid plate having one or several openings, said plate being attached to the peripheral edges in a leak-tight manner and located adjacent and under the injection wall, said plate further comprising plug means suitable for closing the connection opening of the container. Such a plug ensures that the container can reclose in a leaktight manner after usage, in particular if the deformation of the connection means is elastic (i.e. reversible when the outward thrust is released). This removes the risk of resurgence or leakage of product through the connection opening when some product remains under pressure within the container after the connection between the container and the machine is released.

The present invention is further directed to a method for preparing a food or beverage from a container as described above, that contains at least one precursor ingredient, comprising the steps of:

(i) inserting said container in a food or beverage machine having a pressurized source of a mixing ingredient, (ii) establishing a fluid connection between said container and said source, (iii) introducing said mixing ingredient within said container, and mixing said mixing ingredient with said precursor ingredient to create a food or beverage product, (iv) delivering said food or beverage product to a consumer through a delivery wall of said container, characterized in that the connection between said container and said pressurized source of mixing ingredient is performed by expanding outwardly the expandable connection means of the container.

In a preferred embodiment of the invention, the expansion of the container's connection means is performed by mechanically connecting catching means of the container to an expansion actuator of the machine and then actuating said actuator to apply an outwardly directed thrust to said expandable connection means such that the connection opening of said container is brought in a leaktight and fluid communication with the pressurized source of mixing ingredient.

Furthermore, the expansion of the container's connection means can be performed either by stretching at least one portion of the injection wall capable of being outwardly deformed, elastically or plastically, by an outward thrust without tearing or breaking, or alternatively by deploying at least one bellows-like portion of the injection wall capable of being outwardly deformed, elastically or plastically, by an outward thrust without tearing or breaking.

BRIEF DESCRIPTION OF THE DRAWINGS

Additional features and advantages of the present invention are described in, and will be apparent from, the description of the presently preferred embodiments which are set out below with reference to the drawings in which:

FIG. 15 shows how the capsule of FIGS. 13 and 14 is withdrawn from the machine.

DETAILED DESCRIPTION OF THE INVENTION

Figure 1:
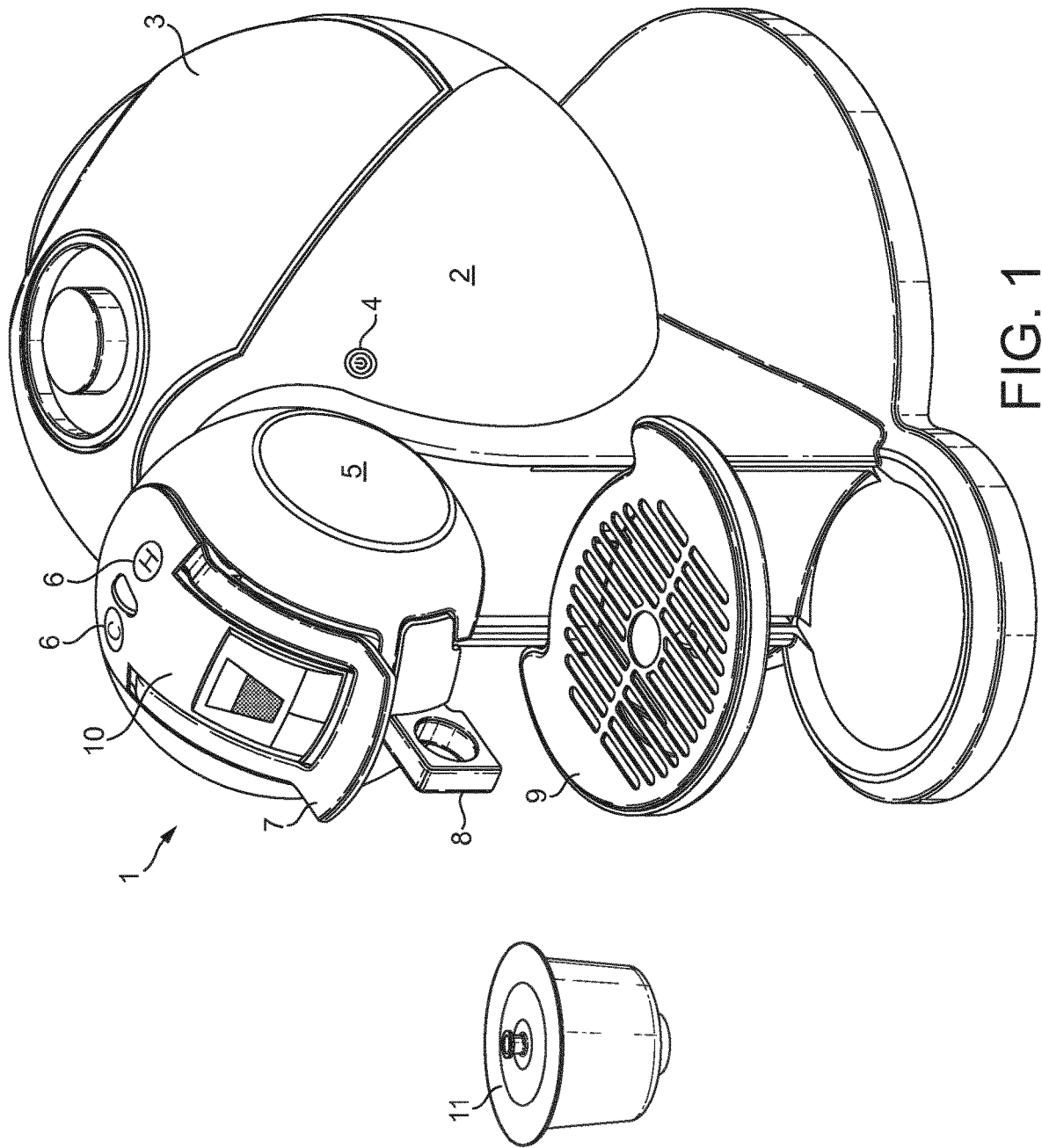
FIG. 1 is schematic perspective view of a food or beverage preparation system comprising a machine and a capsule.

Two embodiments of a container according to the present invention will now be described in detail, with reference to the drawing. In these two embodiments, it is considered that the container is a beverage capsule for use in a beverage preparation machine. The capsule contains a precursor ingredient, typically roast and ground coffee powder The machine and the capsule constitute a beverage preparation system, as illustrated in FIG. 1.

As shown in FIG. 1, the machine 1 comprises a machine body 2, a reservoir 3 adapted for containing a mixing ingredient, for instance water, said reservoir being removable from the machine body 2 for refill. The body 2 comprises an on/off push button 4. The machine 1 further comprises an extraction head 5. The head 5 comprises a water temperature selector for hot or cold water taking the form of two buttons 6 (one for selecting a hot beverage, the other for cold), a locking lever 7, and an opening for insertion of a capsule holder 8. The machine 1 further comprises a cup tray 9, for holding a cup under the extraction head. The machine further comprises a control panel 10 comprising a selector wheel for selecting for instance the volume of beverage to be dispensed, as well as a screen, wherein data about the beverage preparation settings are represented. The capsule holder 8 is adapted to receive a capsule 11.

The machine comprises a fluid pipe system and a pump that convey the water held in the reservoir towards the extraction head where it is injected inside the capsule. Optionally, the mixing fluid can be conveyed through a heating or chilling element of the machine, that is located between the reservoir of the machine and the extraction head. The water is delivered to the capsule as a pressurized source. In other words, the pressurized fluid source is constituted by the beverage preparation machine comprising a fluid reservoir, a fluid pump, and optionally a device for heating or chilling said fluid.

Generally in the context of the present invention, by "pressurized" source of mixing ingredient (e.g. water) it is meant that the source comprises an element that generates a pressure to force the flow of mixing ingredient towards the capsule. However, the relative pressure of mixing ingredient within the capsule compartment is not necessarily above atmospheric pressure. However, the mixing ingredient is preferably at a relative pressure inside the capsule, which is comprised between 1 and 20, more preferably 2 to 12 bar.

The machine 1 is suitable for holding a precursor ingredient capsule as will described hereafter. In the following description, it will be considered that the precursor ingredient contained within the capsule is a roast and ground coffee powder (first embodiment described), or alternatively a soluble powder to be dissolved by mixing with the mixing ingredient (water).

Figure 2:
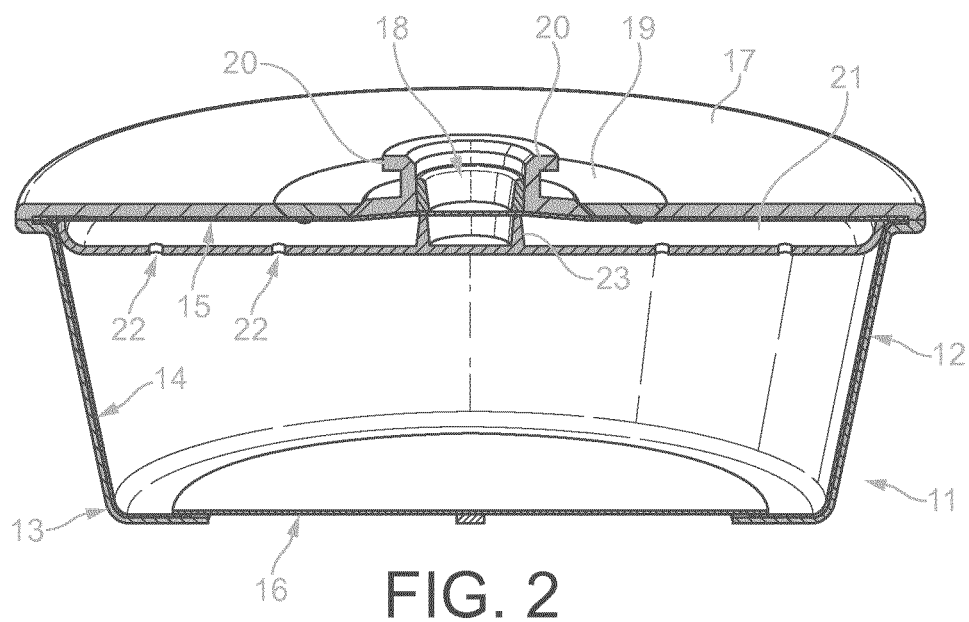
FIG. 2 is a schematic side cut view of a capsule according to a first embodiment of the invention.
Figure 3:
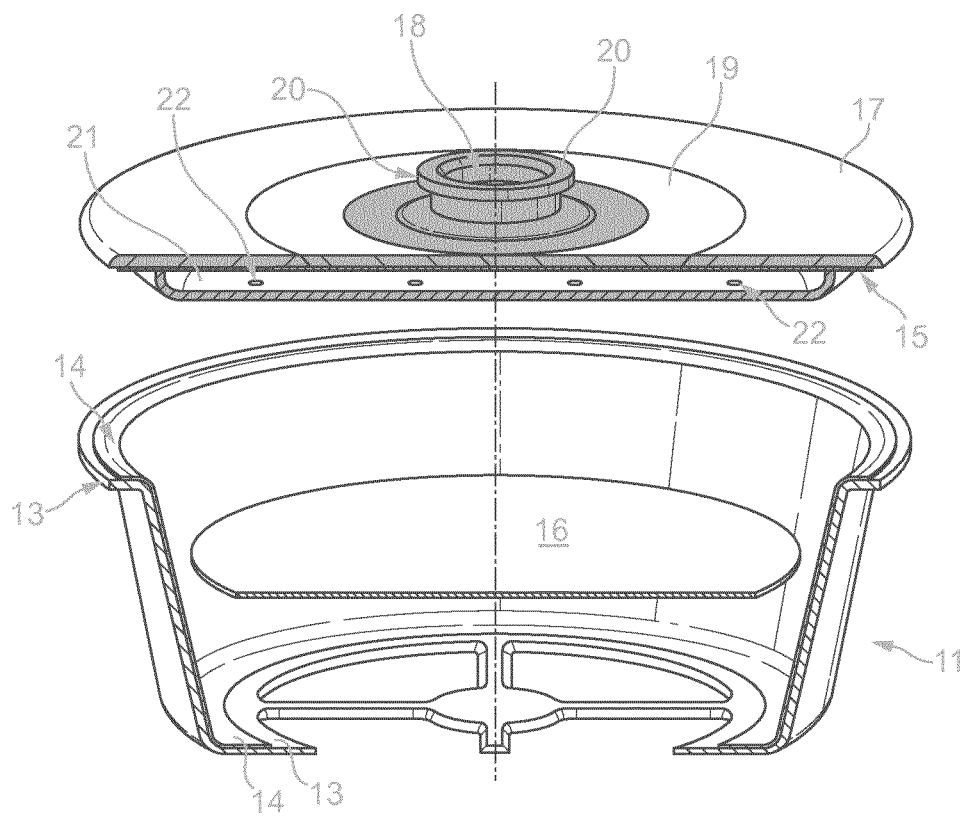
FIG. 3 is a split view of the capsule shown in FIG. 2.

A first embodiment of a beverage capsule 11 is illustrated in FIGS. 2 and 3. The capsule 11 is a closed capsule that comprises a capsule body 12, which is made of a rigid or semi-rigid thermoplastic such as a polypropylene or polyethylene. By "closed", it is meant a capsule that is at least tight to solids, powders, gels and liquids. The capsule body 12 has a generally cylindrical or frustoconical shape. The material can also be made from a biodegradable material such as a material containing cellulosic fibres, or starch for instance. The manufacturing process can be thermoforming or injection. It can also involve in-mould labelling, for instance in order to provide the capsule with specific barrier properties by using a film label with moisture and oxygen barrier properties. Such an in-mould labelling process for making a capsule is generally described in the applicant's European patent publication EP 2559636 A1. A capsule made with such an in-mould labelling process is shown in FIGS. 2 and 3, wherein the capsule body 12 comprises an outer shell 13 made of injected plastic and inner shell 14 which is a label having moisture and oxygen barrier properties. The label 14 is in-mould labelled such that it overlaps with other elements of the capsule having barrier properties, like an upper film barrier 15 that closes the upper portion of the capsule, and a bottom barrier layer 16 that closes the lower dispensing opening of the capsule 11. Such an overlap between the barrier elements of the capsule guarantees that a proper barrier against moisture and oxygen is achieved, which protects the mixing ingredient contained within the capsule against oxidation and degradation of its organoleptic properties during storage. The barrier properties can be achieved with any kind of suitable material such as barrier thermoplastic films having single or multiple layers, or aluminium, or paper, or a combination thereof.

The capsule body 12 comprises upper and lower openings. The upper opening of the capsule body is closed by an upper injection wall 17 and the upper film barrier 15 that is located preferably between said injection wall 17 and the capsule interior. The upper injection wall 17 is welded on upper peripheral edges of the capsule body as shown in FIG. 2.

According to the invention and as illustrated in FIGS. 2 and 3, the injection wall 17 comprises outwardly expandable connection means suitable for connecting the capsule to the mixing ingredient source (i.e. the machine) and establish a fluid communication between said container and said machine. The capsule 11 is opened to allow the mixing fluid (e.g. water) under pressure to enter the capsule compartment when said connection means is expanded. In the following description, it is considered that expansion is achieved by stretching outwardly at least part of the connection means.

Stretching can be:
elastic (i.e. performed in the resilient zone of deformation of the material so that the material is able to come back substantially to its initial position when the stretching force is released), or
permanent, such that the stretched portion of the capsule is permanently deformed when the capsule is connected once. In such a case, the permanent deformation ensures that a used capsule cannot be reused.

In the embodiment described therein, the stretching is elastic.

Further, the outwardly stretchable connection means comprises:
(i) a connection opening 18 for conducting the water from the machine 1 towards the interior of the capsule 11, when a fluid communication is established between said capsule and said machine,
(ii) a stretchable wall portion 19 of the capsule, that is able to be expanded outwardly with an increase of between 5% and 80% of its initial volume, and
(iii) catching means 20 adjacent to said stretchable portion 19, said catching means 20 being adapted for cooperating with a expansion actuator 21 of the machine 1 that is able to expand said expandable wall portion.

In this case, the stretchable wall portion 19 is a circular zone that surrounds the connection opening, as shown in FIG. 3.

Furthermore, the connection opening 18 has the shape of a cylinder that extends from the injection wall outwardly.

The catching means comprises a rigid groove 20. As shown in FIGS. 2 and 3, the catching groove 20 surrounds and delimits the connection opening 18.

In the first embodiment of the invention illustrated in FIGS. 2 and 3, the capsule is opened at its bottom part, by tearing or generally rupturing of the bottom barrier layer 16 against an external puncturing mechanism ("external" means "not part of the capsule itself"), typically under the effect of internal pressure rising up within the capsule internal compartment, as water is injected therein under pressure by the machine. The effect of internal pressure inside the capsule compartment is to press onto the bottom layer 16 and flex it outwardly against said puncturing mechanism, which opens said layer 16, thus allowing dispensing of the capsule contents.

The capsule 11 according to this first embodiment of the invention is adapted for roast and ground coffee powder. In order to allow an efficient and even wetting of the coffee mass, and to ensure that the extraction of coffee is optimized, the capsule 11 further comprises a rigid plate 21 having several water distribution openings 22. The plate 21 is attached to the upper peripheral edges of the capsule body 12 in a leak-tight manner and located adjacent and under the injection wall 17.

Furthermore as shown in FIG. 2, the plate 21 also comprises a plug protrusion 23 suitable for closing the connection opening 18 of the capsule. Such a plug 23 ensures that the capsule 11 can reclose in a leaktight manner after usage, in particular as the deformation of the connection means is elastic (i.e. reversible when the outward thrust is released).

This removes the risk of resurgence or leakage of product through the connection opening when some product remains under pressure within the container after the connection between the container and the machine is released. The functioning of the closing plug 23 will be further explained hereafter. Generally, the plug 23 has the shape of an upwardly extending cylinder whose outer diameter substantially corresponds—with a reserve for the functional play—to the inner diameter of the connection opening 18. Alternatively, the outer diameter of the plug 23 can be greater than the inner diameter of the connection opening 18, but it shall not extend beyond the stretchable zone of the upper injection wall 17. In the latter alternative, the sealing effect of the plug 23 is obtained by contact against the lower surface of the injection wall 17 as shown in FIG. 2 for instance.

Importantly, the fluid connection between the container (e.g. capsule) and the pressurized source of mixing ingredient (e.g. water) can be performed at the time the container is mechanically connected to the expansion actuator, or later. For instance, the fluid connection can be performed after the expandable portion of the container is expanded, or even later, at the time the fluid source is put under pressure (by effect of the machine pump).

Figure 4:
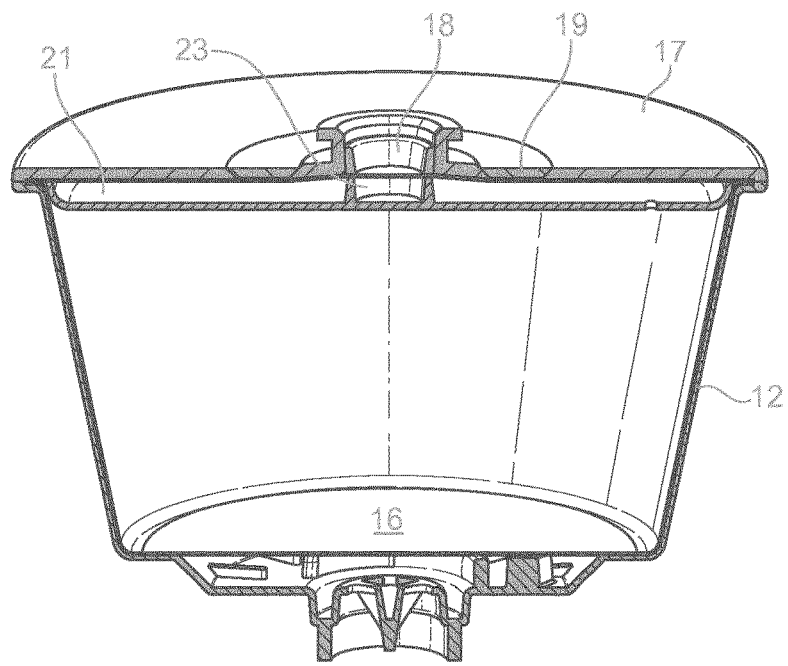
FIG. 4 is a schematic side cut view of a capsule according to a second embodiment of the invention.
Figure 5:
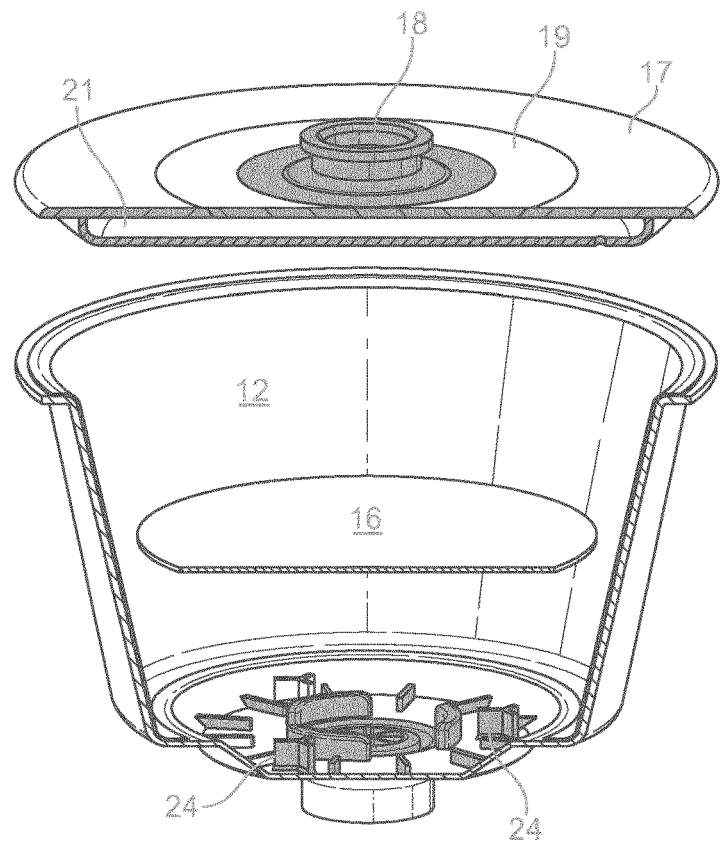
FIG. 5 is a split view of the capsule shown in FIG. 2.

A second embodiment of a beverage capsule 11 is illustrated in FIGS. 4 and 5. The general structure of the capsule in this embodiment is similar to the capsule according to the first embodiment described above. The two main differences concern firstly the distributor plate 21, and secondly the rupturing means which perform the opening of the bottom barrier layer 16.

The distributor plate 21 according to this second embodiment comprises a single distributor opening 22, as shown in FIGS. 4 and 5. This single opening 22 creates a powerful jet of water inside the capsule, which builds a whirling stream of water throughout the capsule compartment. Such a whirling effect is particularly beneficial for improving the mixing and dissolution between the soluble powder and the water, and in some cases, it also helps creating an aeration of the beverage product created within the capsule, giving a nice creamy, aerated and foamy texture when it is desired (for instance with milk products, or smoothies, or cold teas).

The rupturing means that perform the opening of the bottom barrier layer 16 are integrated to the capsule, instead of being an external mechanism as per the first embodiment described above. Such rupturing means are illustrated in FIG. 5, and comprise a series of upwardly directed and built-in protrusions 24, having the shape of spikes, or blades. These rupturing protrusions have the effect of rupturing or tearing, or piercing the barrier layer 16 that is located above, when the water pressure inside the capsule builds-up (during injection of water inside the capsule for dissolution with the soluble powder contained therein). At a predetermined pressure, the capsule opens when the barrier layer 16 flexes and is pressed onto the spikes or blades 24.

The present invention is further directed to a method for preparing a food or beverage from a container as described above. The method comprises the steps listed and described hereafter.

Figure 6:
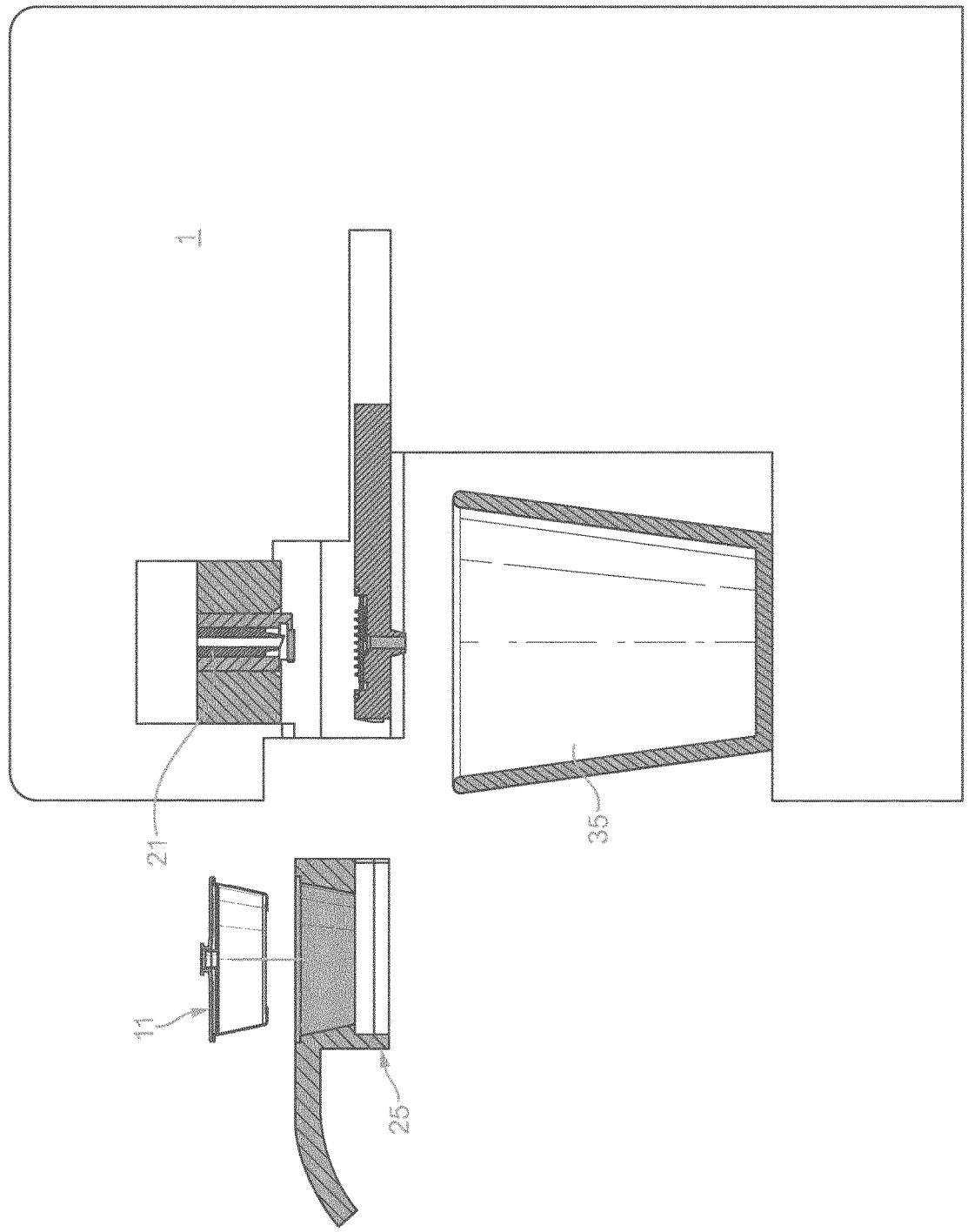
FIG. 6 is a schematic side cut view showing the introduction of a capsule according to the first embodiment, within a food or beverage machine.

First of all, a capsule according to the present invention is inserted in a food or beverage machine having a pressurized source of a mixing ingredient, as illustrated in FIG. 6. More precisely, the capsule 11 is loaded into a capsule holder 25 which resembles a drawer and is detachable or semi-detachable from the main body of the machine 1.

Figure 7:
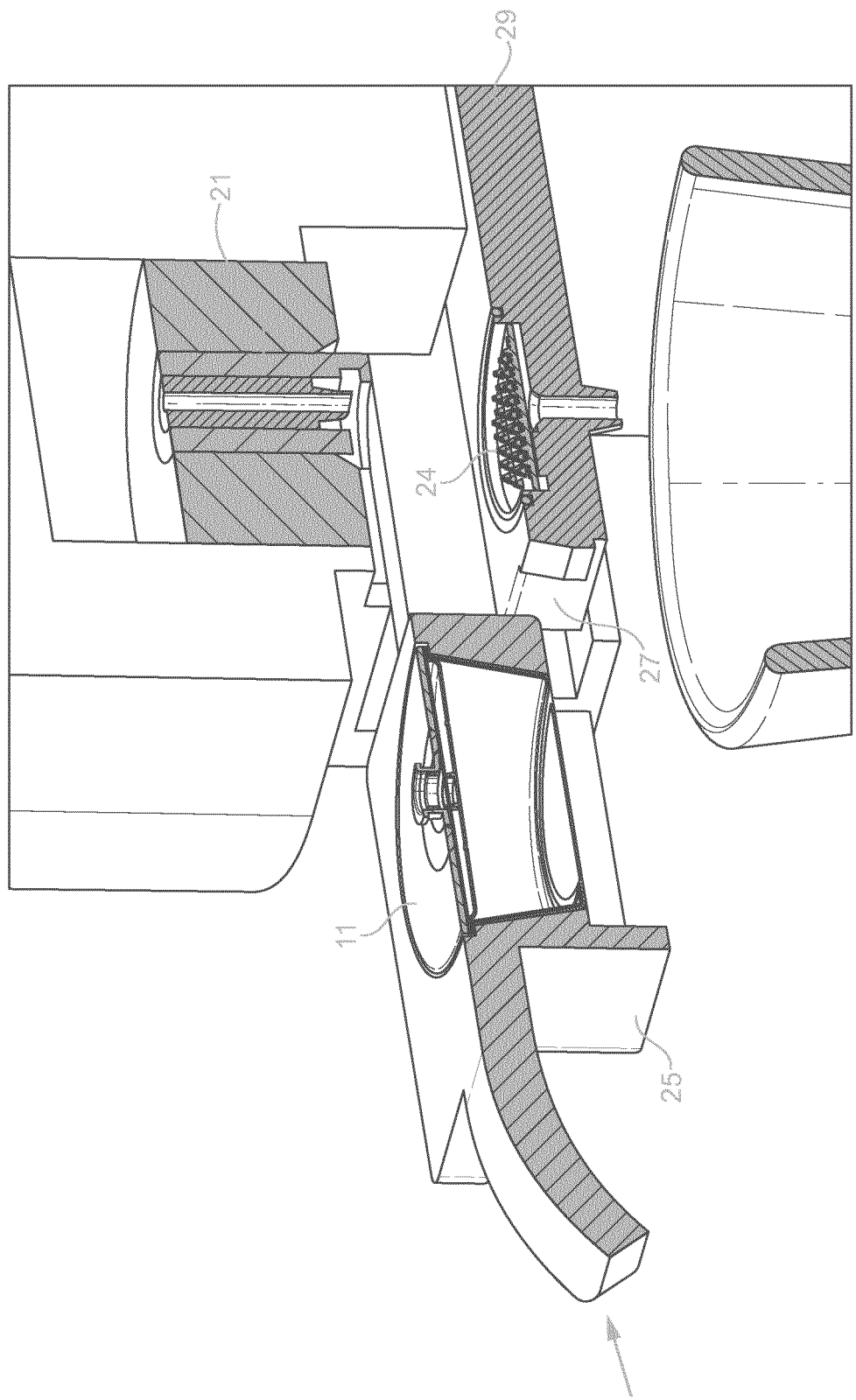
FIGS. 7 and 8 are schematic cut perspective views similar to FIG. 6.

Once the capsule 11 is loaded into the capsule holder 25, the capsule holder is inserted into the extraction head of the machine 1, as shown in FIG. 7. The machine 1 comprises a plate 26 holding a puncturing mechanism in the form of a series of rupturing protrusions (e.g. spikes) 24 covering the surface of at least a portion of said puncturing plate, as shown in FIG. 7. The plate 26 is movably attached to the rest of the machine, such that it can slide horizontally when its front end 27 is pushed. In that case the plate 26 slides into the machine body, and comes back into its initial "extended" position in case the pushing effort is released.

Figure 8:
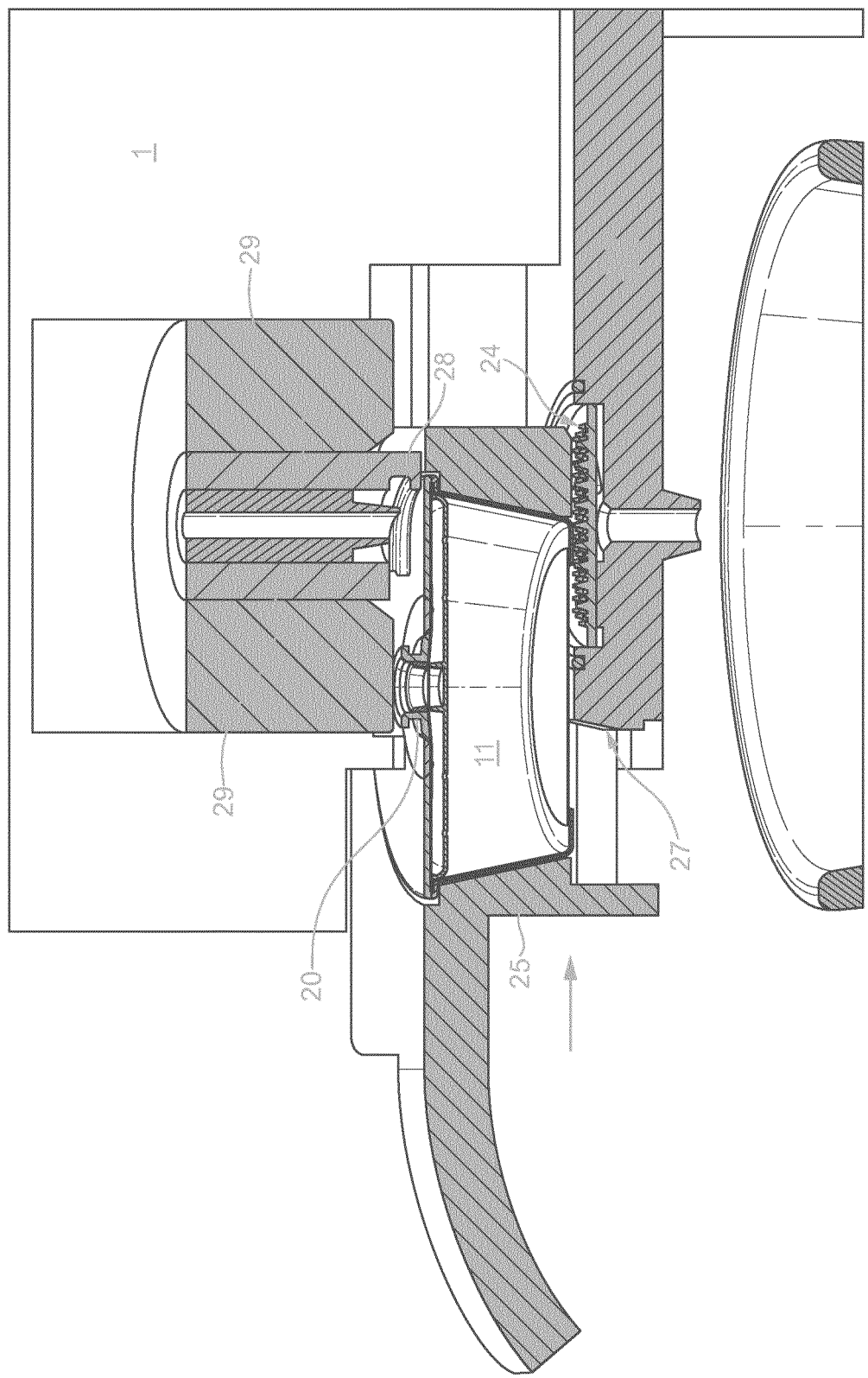
Figure 9:
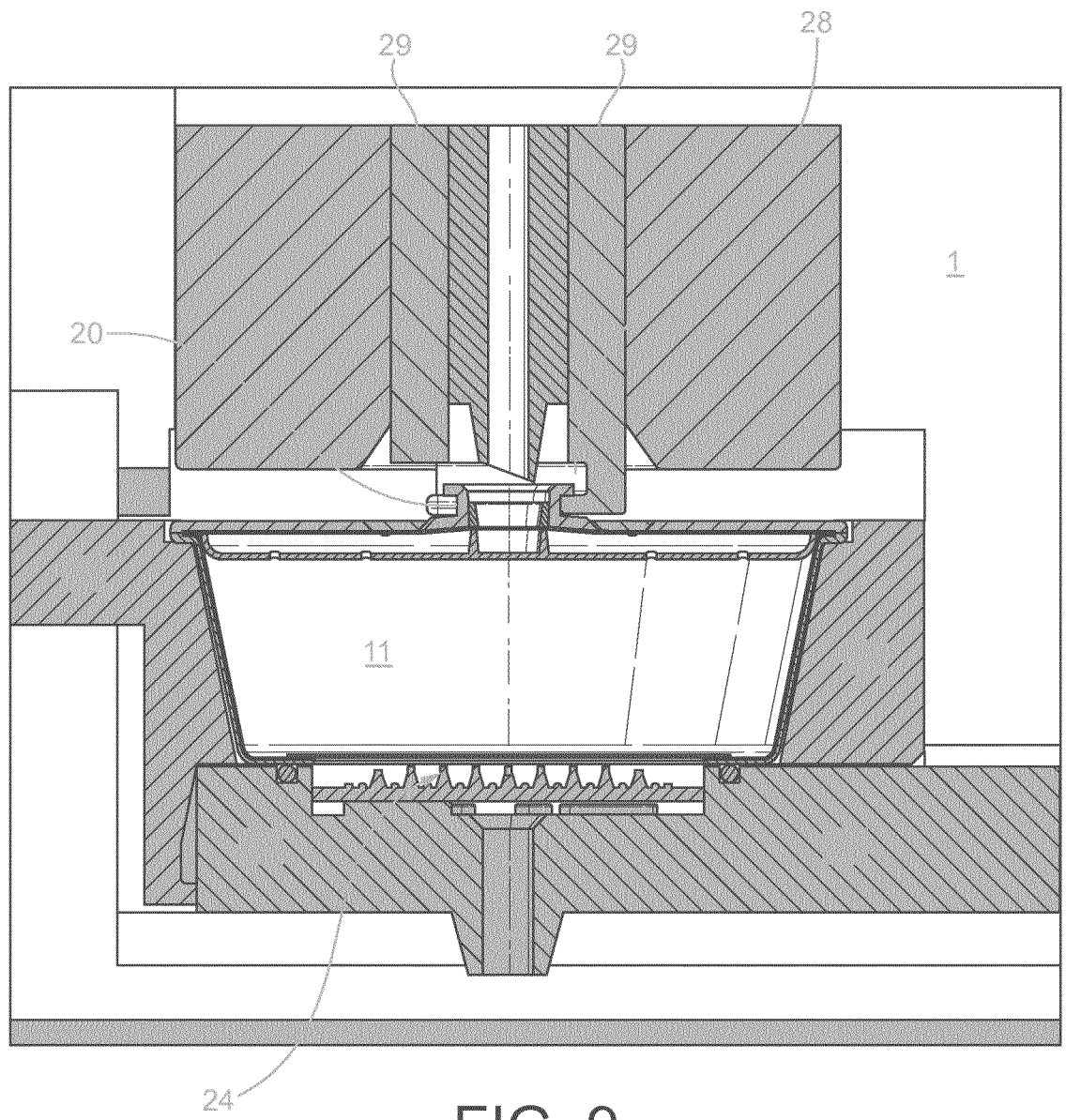
FIG. 9 is a schematic cut side view of a capsule according to the first embodiment of the invention, that is enclosed within a food or beverage preparation machine.

In the first embodiment of a capsule as described above, the height of the capsule is such that its lower part does not extend beyond the vicinity of the capsule holder's holding body. Therefore, as the capsule holder loaded with the capsule is inserted into the machine, the puncturing plate 26 of the machine is not displaced, as shown in FIG. 8, because the capsule does not come in contact with the front end 27 of said plate 26. Furthermore, as the capsule holder 25 is inserted into the machine 1, the catching groove 20 of the capsule 11 comes into contact and mechanically connects to a corresponding catching groove 28 of a machine expansion actuator 29, as illustrated in FIGS. 8 and 9.

Figure 10:
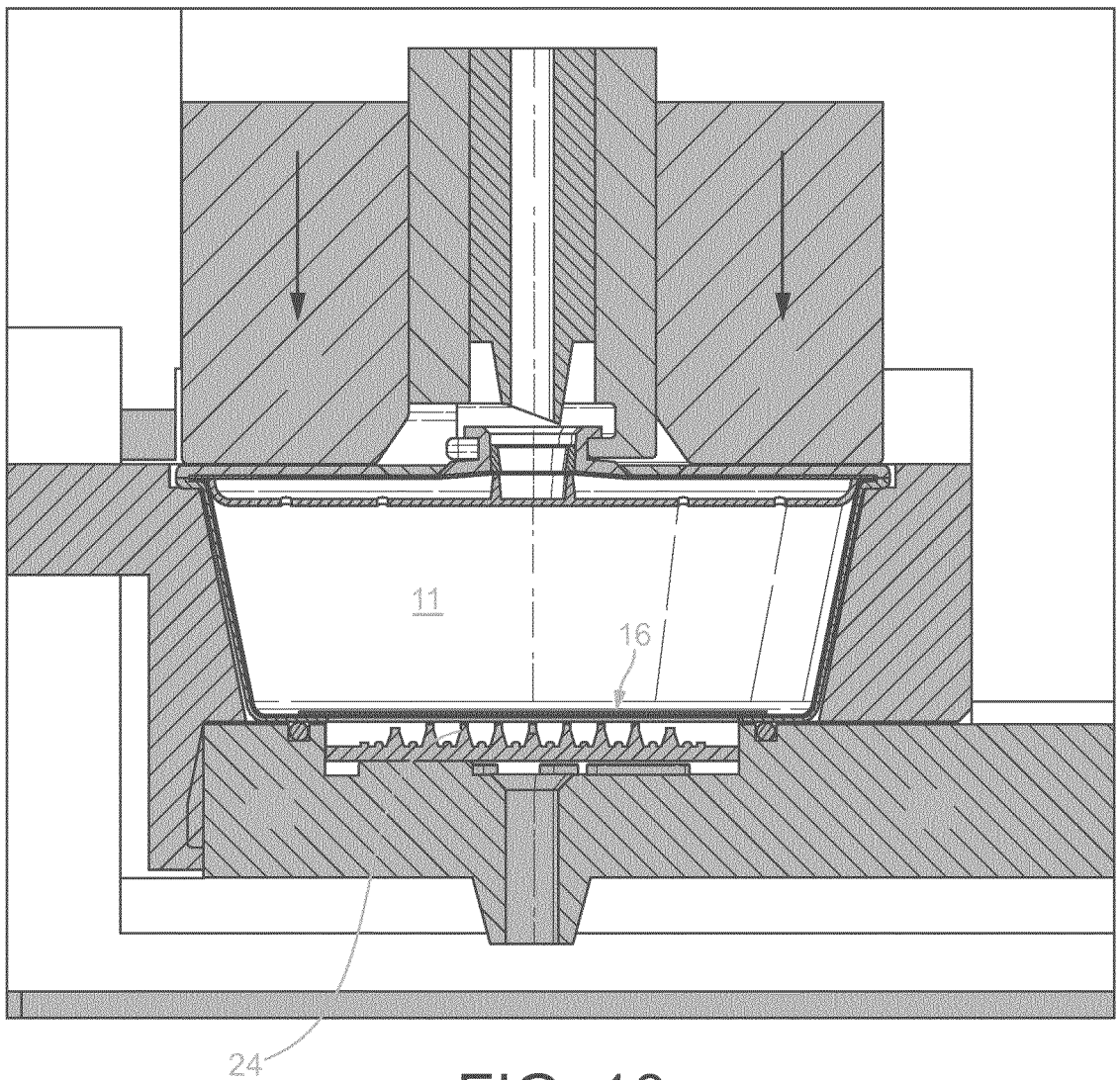
FIGS. 10 to 12 are schematic cut side views showing how the capsule is expanded for connecting to the pressurized fluid source of the machine.

Then, secondly, the connection between said capsule 11 and the pressurized source of water is performed by moving downwards a maintaining ring 30 of the machine as shown with arrows in FIG. 10, which presses onto the top surface of the capsule 11 in a circular peripheral zone of said capsule, so as to maintain firmly the capsule around its periphery during the connexion and beverage preparation process. expanding outwardly the expandable connection means of the container establishing a fluid connection between said container and said source. Then, an expansion of the capsule is performed by moving upwards the expansion actuator 29 of the machine, as illustrated with arrows in FIG. 11, until the connection opening 18 of the capsule is in a leaktight and fluid communication with the outlet 31 of the pressurized source of water. During this upwardly directed movement of the actuator 29, an outwardly directed thrust is applied to the stretchable portion 19 of the capsule, which stretches elastically said portion 19 without breaking nor tearing it. Alternatively, the deformation applied to the material could be in the plastic (i.e. permanent) deformation range. In such a case, the capsule would be damaged during usage and the permanent deformation applied to said capsule at first use, would serve as a tamper-evident means, similarly to what is known as tamper-evidence in the cap industry.

Figure 11:
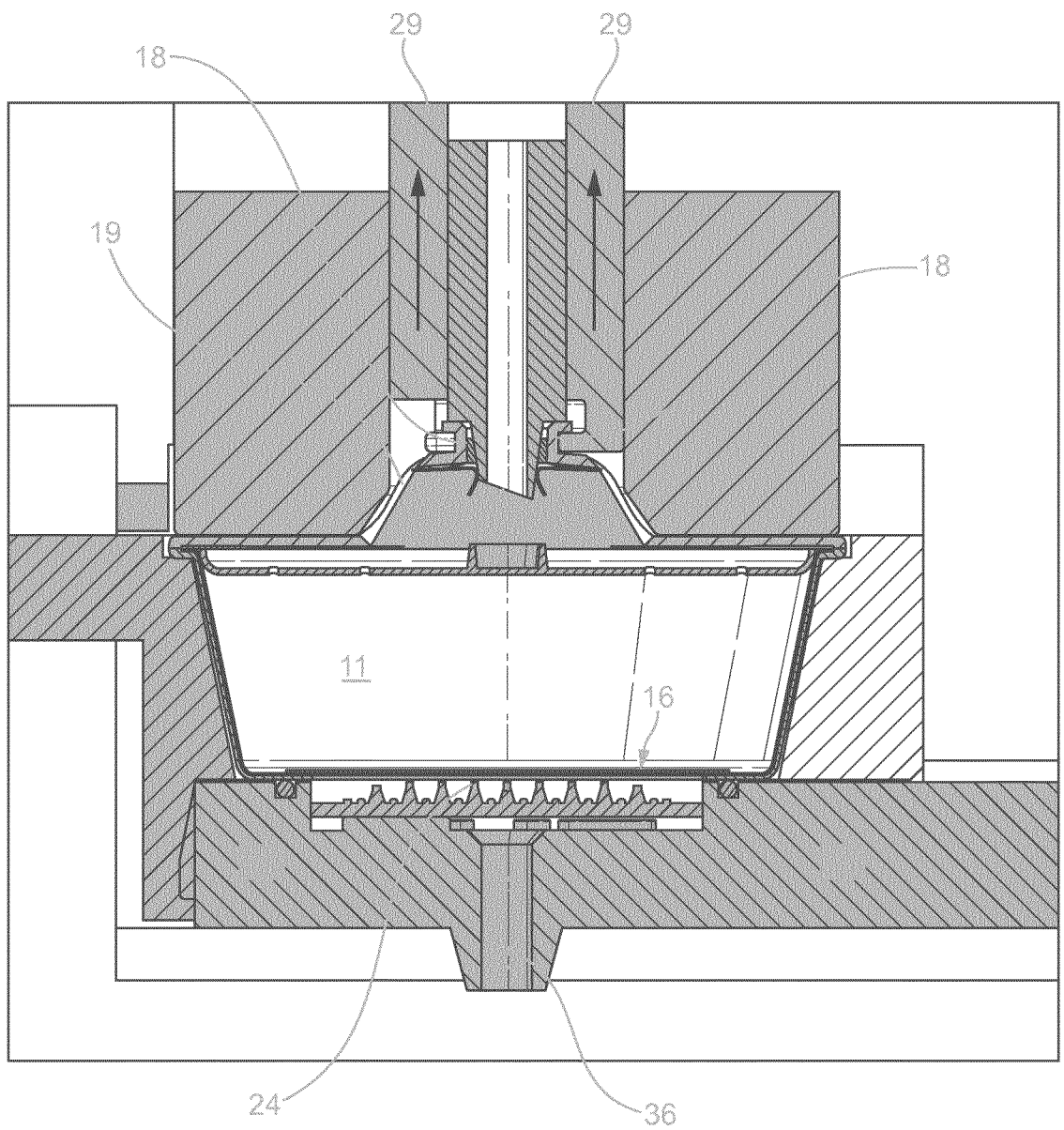

Moreover, due to the connexion between the outlet 31 of the machine water source, and the connection opening 18 of the capsule, the upper film barrier 15 is broken as shown in FIG. 11. Depending on the position of this barrier layer 15, it can be broken during the connection between the capsule 11 and the machine 1, or alternatively, it can be open only subsequently when the pressurized water is injected into the capsule. In any case, it is preferably torn open mechanically by the pressure applied to it (pressure applied by the outlet 31, or by the pressurized water itself). The way the barrier layer 15 is torn open is shown in greater detail in FIG. 12.

Figure 12:
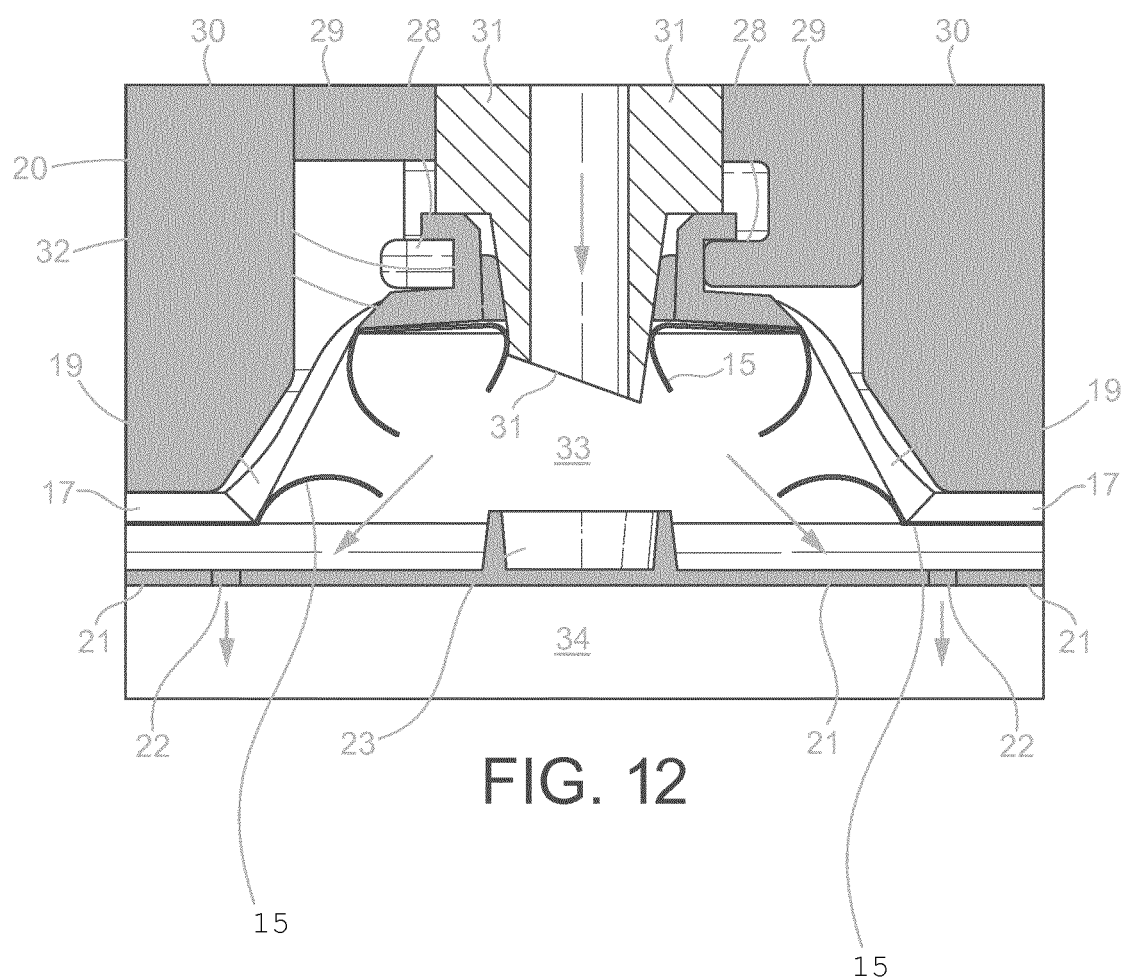

In FIG. 12 is also shown how a sealing ring 32 that is attached either to the outlet 31 or to the inner surface of the capsule connection opening 18 is located between the outlet 29 and the connection opening 18 of the capsule 11, so as to ensure that pressurized water does not leak in between the machine and the capsule during water injection.

When the capsule 11 is expanded as illustrated in FIG. 12, its volume increases as a headspace 33 is created between the upper wall 17 of the capsule, and the distribution plate 21. In this expanded configuration of the capsule, a distance is created between the lower part of the connection opening 18 and the plug 23 described above; therefore the flowpath is freed for the water from the machine towards the inside of the capsule compartment.

The invention is therefore an excellent solution for providing a proper headspace to the capsule, at the time the mixing process of the precursor and mixing ingredients occurs. The headspace that is created during expansion of the capsule for the connection to the machine, can be either a supplemental headspace (i.e. the capsule already comprises a headspace before it is connected to the machine and expanded), or it can be a headspace created fully at the time of expansion of the capsule (i.e. prior to expansion, the capsule does not comprise a real headspace and is filled completely with the precursor ingredient). By headspace, it is meant an empty volume within the vicinity of the capsule internal volume, which is filled only with gas e.g. air, a neutral gas, or a combination thereof).

Then, thirdly, as illustrated in FIG. 12, water is introduced within the capsule. The water flowpath is shown with arrows: it flows from the machine outlet 31, into the headspace 33 between the upper wall 17 and the distributor plate 21, and then through the distribution openings 22 into the capsule compartment 34 where it mixes with the precursor ingredient (e.g. roast and ground coffee or soluble powder) to create a food or beverage product.

The product is then finally delivered to a cup 35 placed below the capsule (shown in FIG. 6) through a dispensing channel 36 of the puncturing plate 26. The capsule self opens as pressure inside the capsule compartment raises such that it flexes said bottom barrier layer 16 down onto the rupturing protrusions 24 of the puncturing plate 26 which break said layer 16 open, along the principle of capsule self-opening described in the Applicant's European patent EP 1472156 B1.

Figure 13:
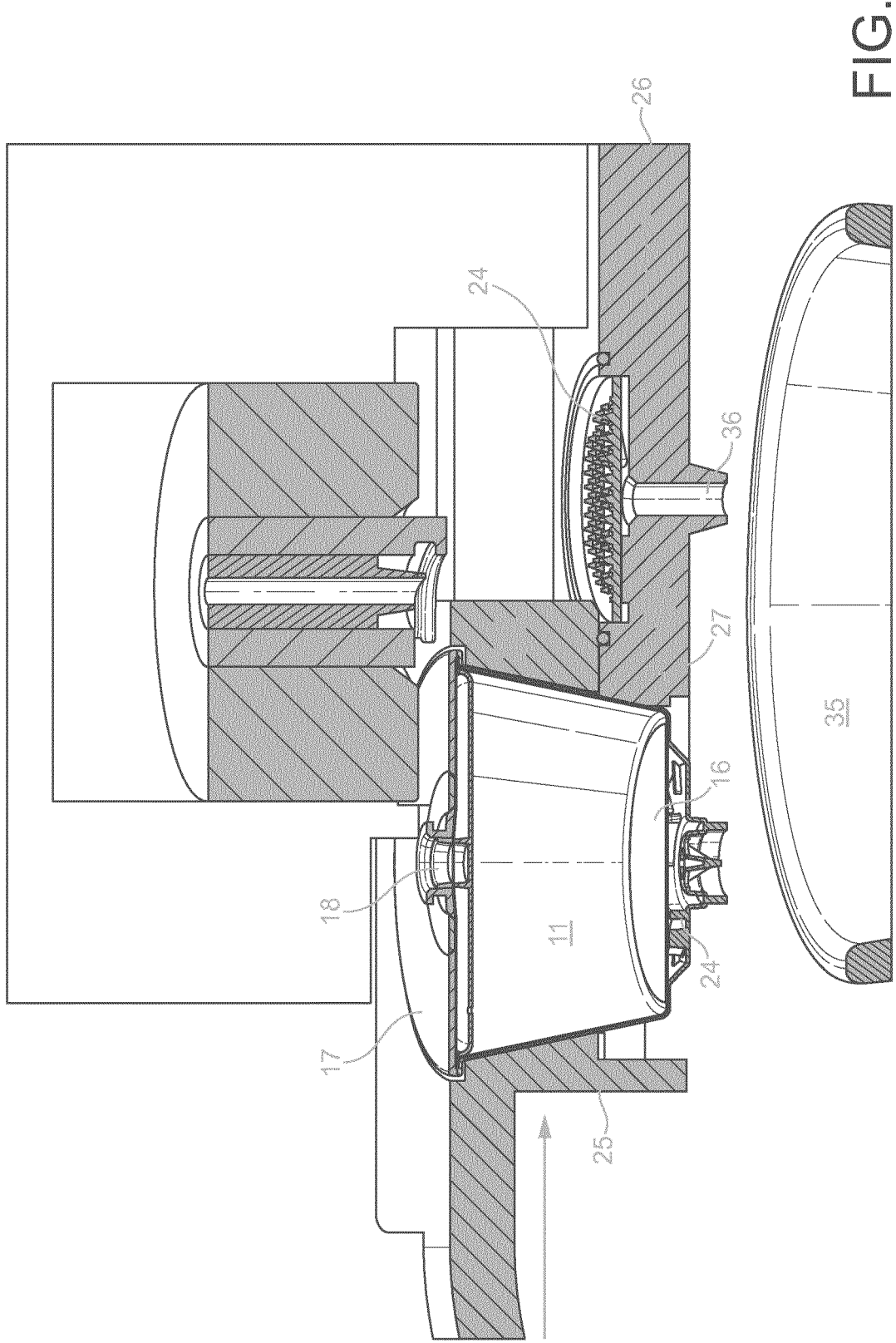
FIG. 13 shows how a capsule according to the second embodiment of the invention is introduced within the machine.
Figure 14:
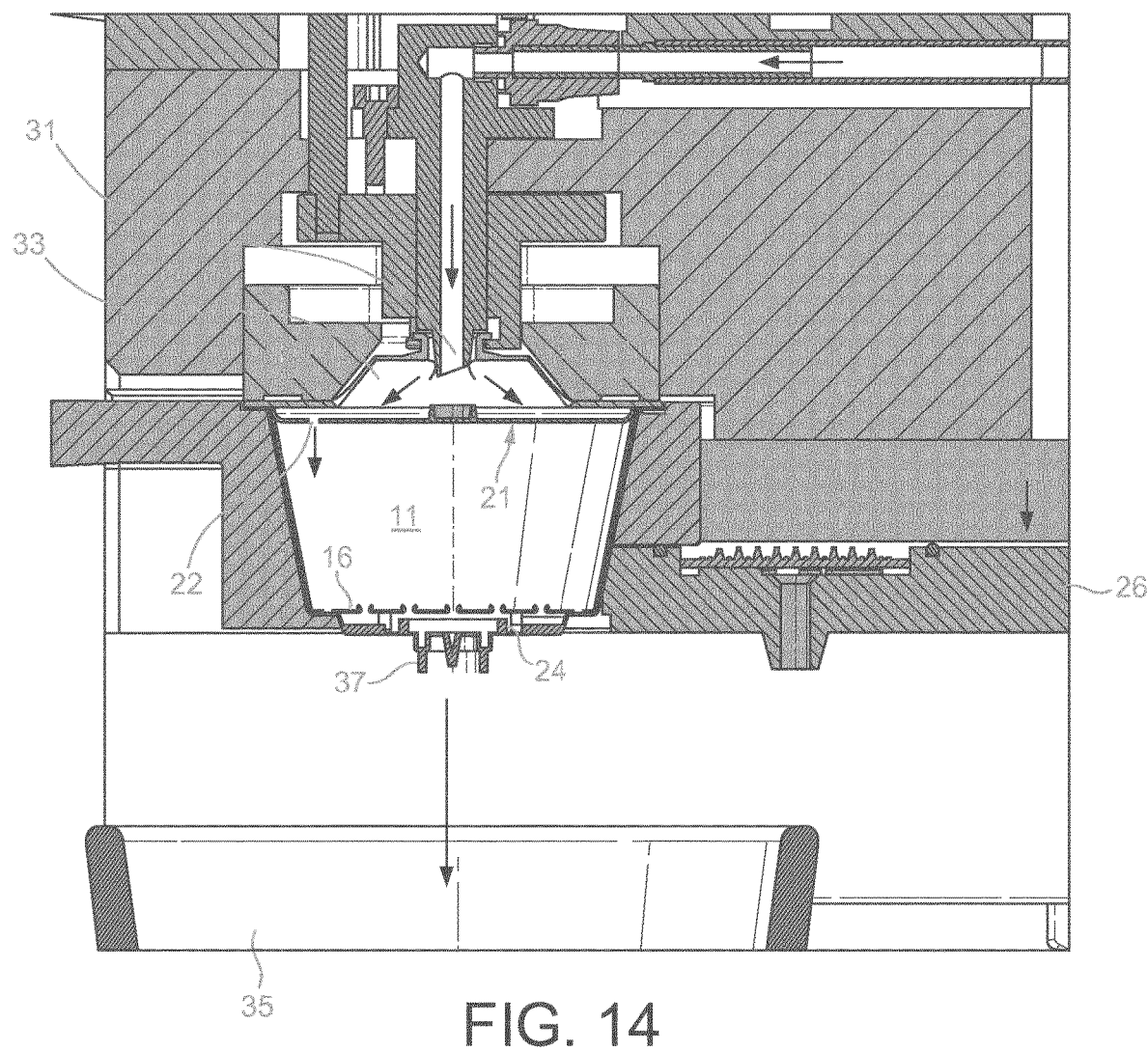
FIG. 14 shows the flowpath of the mixing ingredient that is introduced through the capsule of FIG. 13 for mixing with the precursor ingredient contained therein.

FIGS. 13, 14, and 15, illustrate how a capsule according to the second embodiment described above is used in a beverage preparation machine, for the preparation of a beverage. As explained above, such a capsule is preferably used for the preparation of beverages from a precursor ingredient contained in the capsule which is a soluble ingredient, such as for instance a dairy milk powder, or a powdered tea extract, or a soluble coffee or chocolate. In this case, the capsule 11 is taller such that its bottom part protrudes outside of the lower opening of the capsule holder 25. As shown in FIG. 13, the protruding bottom part of the capsule pushes onto the front end 27 of the puncturing plate 26 when the capsule holder and capsule are inserted into the machine 1. Therefore, by inserting the capsule holder 25 and capsule 11 inside the machine 1, the user also retracts the puncturing plate 26 inside the machine as shown with an arrow in FIG. 13. The insertion of the capsule holder is performed by sliding the capsule holder along a guiding path (e.g. coping rails) of the machine extraction head which holds vertically and guides the sliding movement of the capsule holder inside or outside of the machine.

FIG. 14 is a figure similar to FIG. 12, which illustrates the flow path from the machine towards the capsule 11, when said capsule is connected to the machine, and in the expanded (stretched) configuration. Generally, the functioning of the capsule 11 and machine 1 is the same as described previously for the first embodiment of the capsule. Opening of the bottom membrane 16 onto the rupturing protrusions 24 when pressure inside the capsule raises, is similar. However, in this case the rupturing protrusions are integrally formed as a part of the capsule as shown in FIGS. 13 and 14. Once the capsule bottom is open, product is dispensed into the cup by flowing directly throughout a dispensing channel 37 of the capsule, as shown in FIG. 14.

After the beverage product is dispensed into the cup, the user can stop the machine, or the machine stops automatically. A manual embodiment of the machine is illustrated in FIG. 15, wherein the machine comprises a lever 38 which is used for lifting or lowering the actuator 29 of the machine and make the fluid connection between said machine and the capsule. When the beverage preparation and dispensing is done, the user can use the lever to lower the actuator 29 and release the stretching thrust that was applied to the stretchable portion 19 of the capsule 11, which returns to its initial position, as shown in FIG. 15. In this position, the lower part of the connection opening 18 of the capsule rests back against the plug 23, such that the flow path is substantially blocked and no liquid or solid particles can flow back upwardly from the capsule compartment through the connection opening of the capsule. It was also found that by reclosing the upper part of the capsule, the dripping of remaining liquid from the capsule compartment through the bottom dispensing channel 37 is substantially reduced.

Also, in this position, the capsule catching groove 20 can be released from the corresponding catching groove 28 of the machine actuator, and the capsule holder 25 containing the used capsule can be withdrawn from the machine as indicated with an arrow in FIG. 15. As the capsule holder 25 is withdrawn from the machine, the spring-mounted puncturing plate 26 is moved back to its initial position, as also indicated by an arrow in FIG. 15. The used capsule can then be withdrawn from the capsule holder and discarded, or re-filled and re-used if such a possibility is allowed. Preferably, capsules according to the present invention are single use capsules.

Last but not least, it was surprisingly found that the capsule according to the present invention also provides an interest for the simplification and improvement of the machine it is meant to be connected to. Since the capsule is expanded for connecting to the machine, the water source does not need to be movable in the machine, and therefore the water pipe system of the machine is simplified, and rigid piping can be used, instead of flexible pipes used in machines wherein the water injection system needs to be moved towards the capsule. Moreover, due to the fact that rigid pipes are used, the vibrations and noise generated during the machine operation are greatly reduced (it was found that noise is generated by flexible pipes vibrating when fluid flows through). A machine for use with a capsule according to the invention is therefore more compact due to the piping fluid system which is less complex.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A container for food or beverage preparation, the container adapted for containing at least one precursor ingredient within at least one compartment, the container comprising an injection wall for coupling to a food or beverage preparation machine having at least one pressurized source of a mixing ingredient, whereby a food or beverage product is prepared within the container by mixing the mixing ingredient with the at least one precursor ingredient, the container further comprising at least one food or beverage delivery wall, the injection wall comprises an outwardly expandable connector suitable for connecting the container to the at least one pressurized source of the mixing ingredient to establish a fluid communication between the container and the at least one pressurized source of the mixing ingredient, the outwardly expandable connector means comprising
- (i) a connection opening for conducting the mixing ingredient from the at least one pressurized source of the mixing ingredient towards an interior of the container when a fluid communication is established between the container and the at least one pressurized source of the mixing ingredient;
- (ii) an expandable wall portion of the container configured to be expanded outwardly with an increase of between 1% and 200% of an initial volume; and
- (iii) a catcher adjacent to the expendable wall portion, the catcher adapted for cooperating with an expansion actuator of the food or beverage preparation machine that applies an outwardly directed thrust to the outwardly expandable connector to expand the expandable wall portion.

2. The container according to claim 1, wherein the outwardly expandable connector comprises at least one stretchable portion of the injection wall configured to be outwardly deformed, elastically or plastically, by the outward thrust without tearing or breaking.

3. The container according to claim 1, wherein the outwardly expandable connector comprises at least one portion of the injection wall, the at least one portion is a bellows configured to be outwardly deformed, elastically or plastically, by the outward thrust without tearing or breaking.

4. The container according to claim 1, wherein the expandable wall portion is a circular zone that surrounds the connection opening.

5. The container according to claim 1, wherein the connection opening has a shape of a cylinder that extends from the injection wall outwardly.

6. The container according to claim 1, wherein the connector comprises a barrier wall adjacent to the expandable wall portion for closing the connection opening, and the barrier wall is made of a material barrier to at least moisture and oxygen, and openable by the at least one pressurized source of the mixing ingredient.

7. The container according to claim 6, wherein the barrier wall is openable by piercing by a piercing element of the at least one pressurized source of the mixing ingredient.

8. The container according to claim 6, wherein the barrier wall is openable by tearing by a pressure exerted by the at least one pressurized source of the mixing ingredient.

9. The container according to claim 1, wherein the catcher comprises a rigid groove.

10. The container according to claim 1, wherein the catcher comprises a magnetic surface.

11. The container according to claim 1, wherein the catcher surrounds and defines the connection opening.

12. The container according to claim 1, wherein the container is a food or beverage capsule.

13. The container according to claim 12, comprising a rigid body having lateral walls, a bottom wall, the lateral walls defining an upper opening with outer peripheral edges onto which the injection wall is attached.

14. The container according to claim 1, comprising a rigid or semi-rigid plate having at least one opening, the rigid or semi-rigid plate attached to peripheral edges of the container in a leak-tight manner and located adjacent and under the injection wall, the rigid or semi-rigid plate comprising a plug for releasable closing the connection opening.

15. A method for preparing a food or beverage from a container, the method comprising:
- (i) inserting the container in a food or beverage machine having a pressurized source of a mixing ingredient,
- (ii) establishing a fluid connection between the container and the pressurized source of the mixing ingredient,
- (iii) introducing the mixing ingredient within the container, and mixing the mixing ingredient with a precursor ingredient to create a food or beverage product, and
- (iv) delivering the food or beverage product to a consumer through a delivery wall of the container,
wherein the connection between the container and the pressurized source of the mixing ingredient is performed by expanding outwardly an expandable connector of the container by mechanically connecting a catcher of the container to an expansion actuator of the food or beverage machine and then actuating the actuator to apply an outwardly directed thrust to the expandable connector such that a connection opening of the container is brought in a leaktight and fluid communication with a dispensing outlet of the pressurized source of the mixing ingredient.

16. The method according to claim 15, wherein the expansion of the connector comprises stretching at least one portion of an injection wall outwardly deformed, elastically or plastically, by the outward thrust without tearing or breaking.

17. The method according to claim 15, wherein the expansion of the connector comprises deploying at least one portion of an injection wall, and the at least one portion is a bellows outwardly deformed, elastically or plastically, by the outward thrust without tearing or breaking.

18. A system for food or beverage preparation, the system comprising:
- a food or beverage preparation machine having at least one pressurized source of a mixing ingredient; and
- a container adapted for containing at least one precursor ingredient within at least one compartment, the container comprising an injection wall for coupling to the food or beverage preparation machine, a food or beverage product is prepared within the container by mixing the mixing ingredient with the at least one precursor ingredient, the container further comprising at least one food or beverage delivery wall, the injection wall comprises an outwardly expandable connector suitable for connecting the container to the at least one pressurized source of the mixing ingredient to establish a fluid communication between the container and the at least one pressurized source of the mixing ingredient, the outwardly expandable connector means comprising
  - (i) a connection opening for conducting the mixing ingredient from the at least one pressurized source of the mixing ingredient towards an interior of the container when a fluid communication is established between the container and the at least one pressurized source of the mixing ingredient;
  - (ii) an expandable wall portion of the container configured to be expanded outwardly with an increase of between 1% and 200% of an initial volume; and
  - (iii) a catcher adjacent to the expendable wall portion, the catcher adapted for cooperating with an expansion actuator of the food or beverage preparation machine that applies an outwardly directed thrust to the outwardly expandable connector to expand the expandable wall portion.

\* \* \* \* \*